(12) United States Patent
Shao et al.

(10) Patent No.: US 10,977,213 B2
(45) Date of Patent: Apr. 13, 2021

(54) MAINTAINING FILE MANAGEMENT SYSTEMS USING COGNITIVE COMPUTING

(71) Applicant: INTERNATIONAL BUSINESS MACHINES CORPORATION, Armonk, NY (US)

(72) Inventors: Hua Shao, Beijing (CN); Dong Jun Zong, Beijing (CN); Zi Ying Li, Beijing (CN); Kun Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 254 days.

(21) Appl. No.: 16/156,632

(22) Filed: Oct. 10, 2018

(65) Prior Publication Data

US 2020/0117723 A1    Apr. 16, 2020

(51) Int. Cl.
*G06F 16/16*     (2019.01)
*G06N 5/02*      (2006.01)
*G06F 7/14*      (2006.01)
*G06N 20/00*     (2019.01)

(52) U.S. Cl.
CPC .......... *G06F 16/16* (2019.01); *G06F 7/14* (2013.01); *G06N 5/022* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 8,065,267 | B2 * | 11/2011 | Noda | G06F 40/174 707/609 |
| 8,489,549 | B2 * | 7/2013 | Guarraci | G06F 16/188 707/612 |
| 9,189,478 | B2 | 11/2015 | Baris et al. | |
| 9,286,595 | B2 | 3/2016 | Taneja et al. | |
| 10,565,181 | B1 * | 2/2020 | Hjermstad | G06F 16/2379 |
| 2002/0010743 | A1 | 1/2002 | Ryan et al. | |
| 2003/0172168 | A1 | 9/2003 | Mak et al. | |
| 2011/0252400 | A1 * | 10/2011 | Scipione | G06F 8/24 717/108 |
| 2016/0078566 | A1 * | 3/2016 | Farrell | G06Q 10/10 705/30 |
| 2016/0337278 | A1 | 11/2016 | Peruri et al. | |
| 2017/0011029 | A1 * | 1/2017 | Chatterjee | G06F 16/35 |
| 2017/0242836 | A1 | 8/2017 | Marez et al. | |
| 2019/0065976 | A1 * | 2/2019 | Murray | G06N 5/022 |

FOREIGN PATENT DOCUMENTS

CN    107392560 A    11/2017
WO    2008092149 A2    7/2008

* cited by examiner

*Primary Examiner* — Uyen T Le
(74) *Attorney, Agent, or Firm* — Tutunjian & Bitetto, P.C.; Kurt Goudy

(57) ABSTRACT

A computer-implemented method for maintaining a file management system using cognitive computing includes identifying one or more users for assigning respective mergeable copies of a file of a file management system using machine learning, including building a predictive model and predicting the one or more users based on the predictive model, providing the one or more users access to respective ones of the one or more mergeable copies of the file, and automatically merging content from the one or more mergeable copies into the file in accordance with a merge rule.

20 Claims, 6 Drawing Sheets

US 10,977,213 B2

MAINTAINING FILE MANAGEMENT SYSTEMS USING COGNITIVE COMPUTING

BACKGROUND

Technical Field

The present invention generally relates to cognitive computing, and more particularly to maintaining file management systems using cognitive computing.

Description of the Related Art

Enterprises can use electronic documents, such as, e.g., electronic spreadsheets, to collect and manage data in a file management system. Often is the case that individuals in a group within an enterprise (e.g., a hierarchical group) collaborate to provide data for an electronic document associated with the group, and/or edit data within the electronic document.

SUMMARY

In accordance with an embodiment of the present invention, a method for maintaining a file management system using cognitive computing is provided. The method includes identifying one or more users for assigning respective mergeable copies of a file of a file management system using machine learning, including building a predictive model and predicting the one or more users based on the predictive model, providing the one or more users access to respective ones of the one or more mergeable copies of the file, and automatically merging content from the one or more mergeable copies into the file in accordance with a merge rule.

In accordance with another embodiment of the present invention, a system for maintaining a file management system using cognitive computing is provided. The system includes a memory device for storing program code and at least one processor operatively coupled to the memory device. The at least one processor device is configured to execute program code stored on the memory device to identify one or more users for assigning respective mergeable copies of a file of a file management system using machine learning by building a predictive model and predicting the one or more users based on the predictive model, provide the one or more users access to respective ones of the one or more mergeable copies of the file, and automatically merge content from the one or more mergeable copies into the file in accordance with a merge rule.

In accordance with yet another embodiment of the present invention, a computer program product is provided. The computer program product includes a non-transitory computer readable storage medium having program code embodied therewith. The program code is executable by a computer to cause the computer to perform a method for maintaining a file management system using cognitive computing. The method performed by the computer includes identifying one or more users for assigning respective mergeable copies of a file of a file management system using machine learning, including building a predictive model and predicting the one or more users based on the predictive model, providing the one or more users access to respective ones of the one or more mergeable copies of the file, and automatically merging content from the one or more mergeable copies into the file in accordance with a merge rule.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
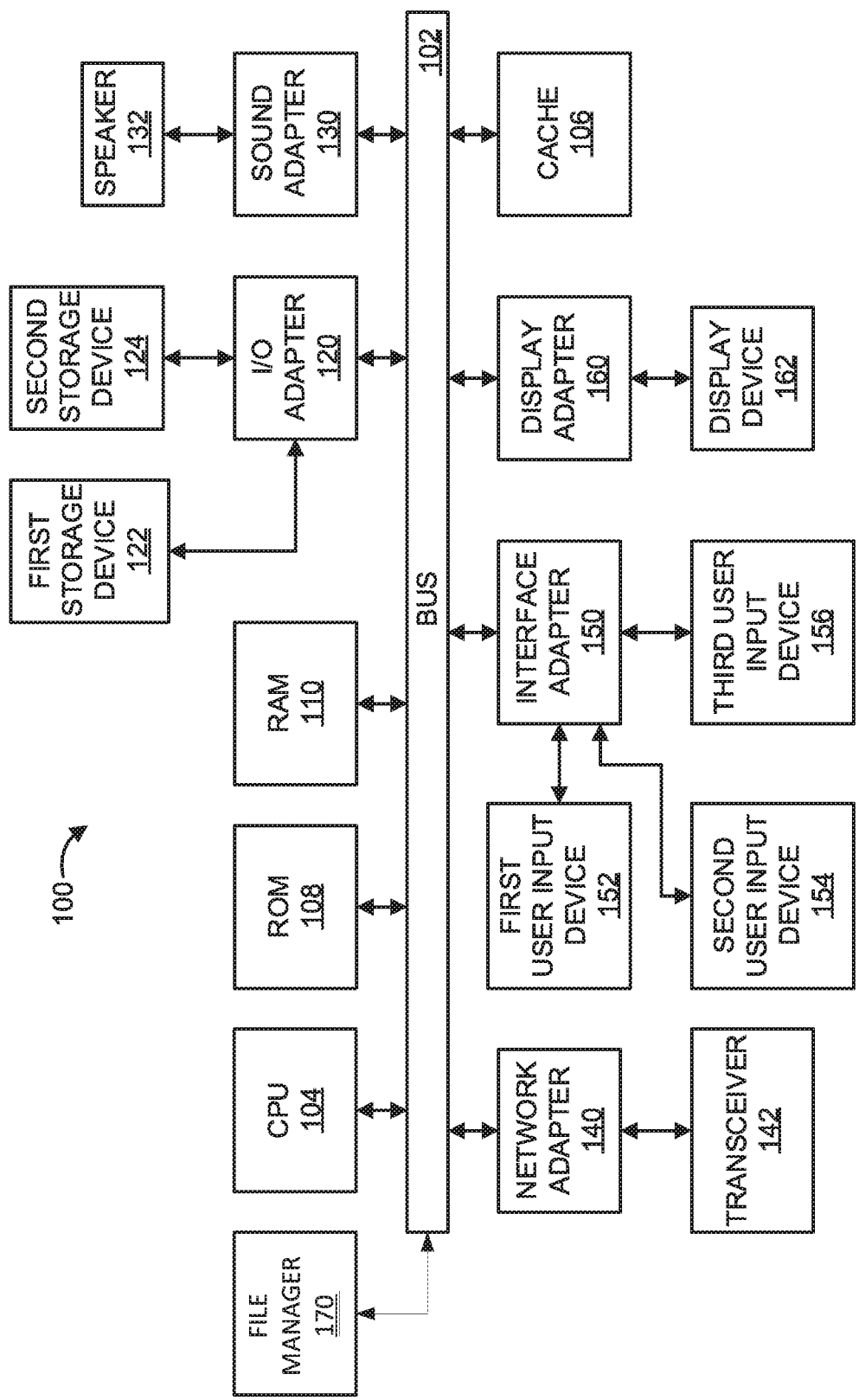
FIG. 1 is a block diagram of a processing system in accordance with an embodiment of the present invention.

The embodiments described herein provide for systems and methods that use cognitive computing to maintain file management systems by dynamically distributing and collecting data (e.g., table-based document data) for collaboration among a group of users.

For example, the embodiments described herein can employ cognitive computing to identify (e.g., predict) one or more users in an organization structure (e.g., hierarchy) who should input data corresponding to an electronic document or file. More specifically, cognitive computing can be used to extract one or more topics associated with a given electronic document. The one or more topics can be extracted by applying a topic modeling algorithm (e.g., latent Dirichlet allocation (LDA)) to an input including information from the given electronic document (e.g., file content and/or file name), with the one or more topics corresponding to one or more keywords output by the topic modeling algorithm. The one or more topics can be used, along with organizational information and user data, as input to an association rule algorithm (e.g., Apriori) to build a model corresponding to the one or more users. The organization information and user data can include, e.g., file content, file name, electronic mail data, electronic chat data, social media data, company policy data, and data related to user role in the organization. The model can be used to then identify (e.g., predict) the one or more users who should input data corresponding to the given electronic document.

The embodiments described herein can clone the given electronic document into mergeable copies, referred to herein as child electronic documents, such that each user has a child electronic document corresponding to the given ("parent") electronic document. A relationship between the given electronic document and each child electronic document can be recorded. The embodiments described herein can provide a mechanism to notify the parent electronic document about the completion of input of data associated with each child electronic document. Additionally, each child electronic document can be compared (e.g., automatically compared) with the parent electronic document to identify changes within a specific range, sheet or an entirety of the file. For example, a merge rule can be defined regarding how to collect the data for a specific range (e.g., list data, sum the data value, append the row, etc.). As another example, the merge rule can be based on an analysis that can be performed on one or more of the structure of the electronic document (e.g., structure of the table), header information, input content, etc. Additionally, the embodiments described herein can write back changes into respective portions (e.g., table cells) of the parent electronic document according to the merge rule.

The embodiments described herein can automatically merge the content from the child electronic documents into the parent electronic document. For example, a merge rule for merging the content from the child electronic documents can be learned and applied to merge the content. Illustratively, an association rule learning analysis can be performed to learn the merge rule. The merging performed in accordance with the embodiments described herein can protect against content loss and errors that can result from multiple people collaborating on an electronic document. For example, the embodiments described herein can improve on manual methods of data input into digital sheets by, e.g., reducing errors and increasing efficiency as compared to such manual methods. Additionally, the embodiments described herein can allow for each person to maintain (e.g., archive and/or copy) their own version of the electronic document.

The embodiments described herein can conform with privacy requirements regarding electronic document content. For example, the embodiments described herein can anonymize the input such that each user's contribution is not known among the group. This can be particularly useful in cases where the electronic document is considered confidential, top secret, etc., or in cases where users may not want others in the group to know they are the contributors of certain data content.

The embodiments described herein can further provide improvements to computer-related technology. For example, the merging of individual files provided by respective users can reduce consumption of computing resources (e.g., storage resources) associated with maintaining the file management system.

Referring now to the drawings in which like numerals represent the same or similar elements and initially to FIG. 1, an exemplary processing system 100 to which the present invention may be applied is shown in accordance with one embodiment. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

File manager component 170 may be operatively coupled to system bus 102. File manager component 170 is configured to perform one or more of the operations described below. File manager component 170 can be implemented as a standalone special purpose hardware device, or may be implemented as software stored on a storage device. In the embodiment in which file manager component 170 is software-implemented, although shown as a separate component of the computer system 100, file manager component 170 can be stored on, e.g., the first storage device 122 and/or the second storage device 124. Alternatively, file manager component 170 can be stored on a separate storage device (not shown).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
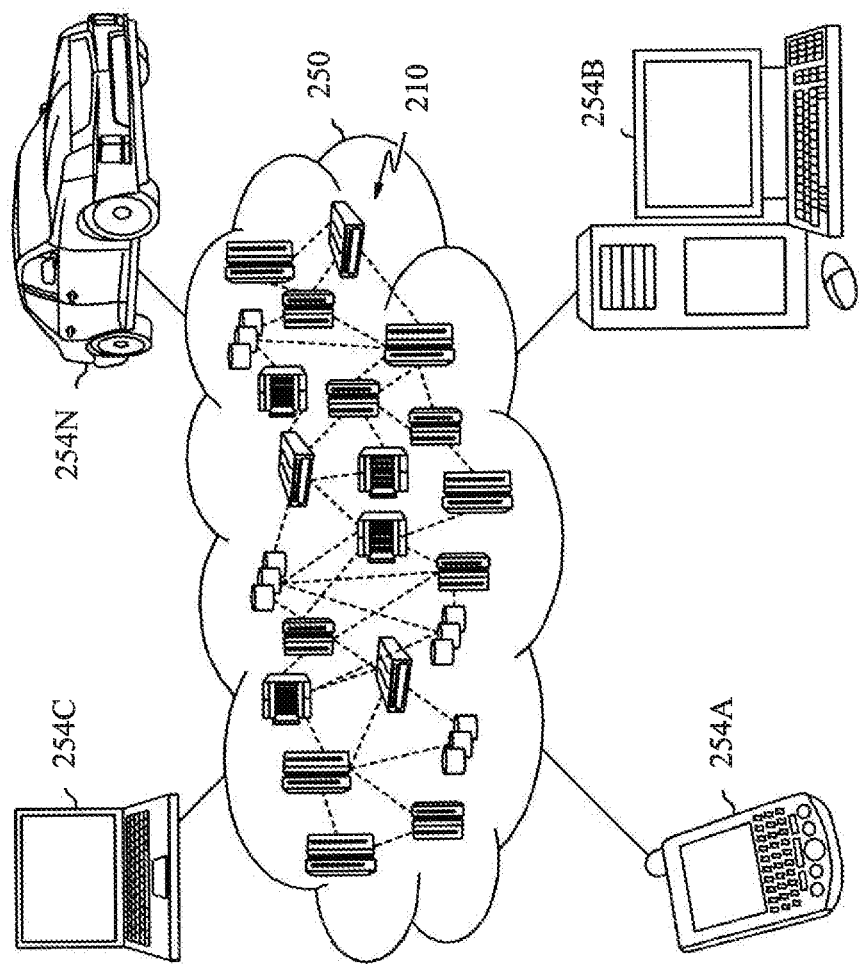
FIG. 2 is a block diagram showing an illustrative cloud computing environment having one or more cloud computing nodes with which local computing devices used by cloud consumers communicate in accordance with an embodiment.

Referring now to FIG. 2, illustrative cloud computing environment 250 is depicted. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 150 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
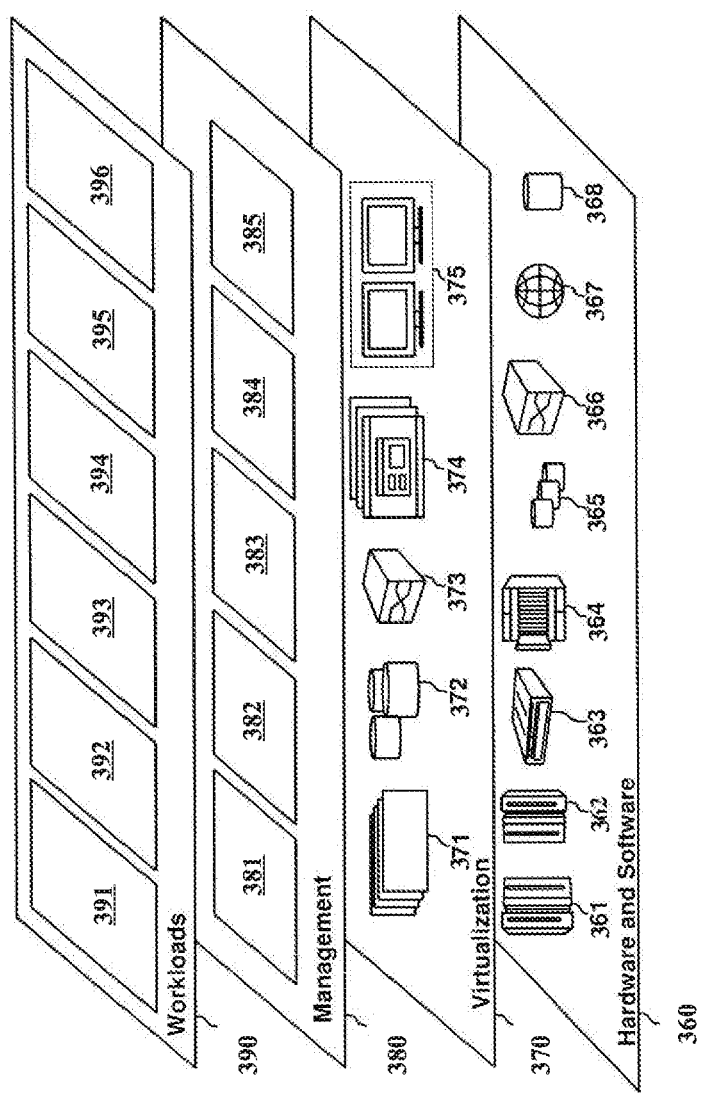
FIG. 3 is a block diagram showing a set of functional abstraction layers provided by a cloud computing environment in accordance with one embodiment.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and file management 396.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
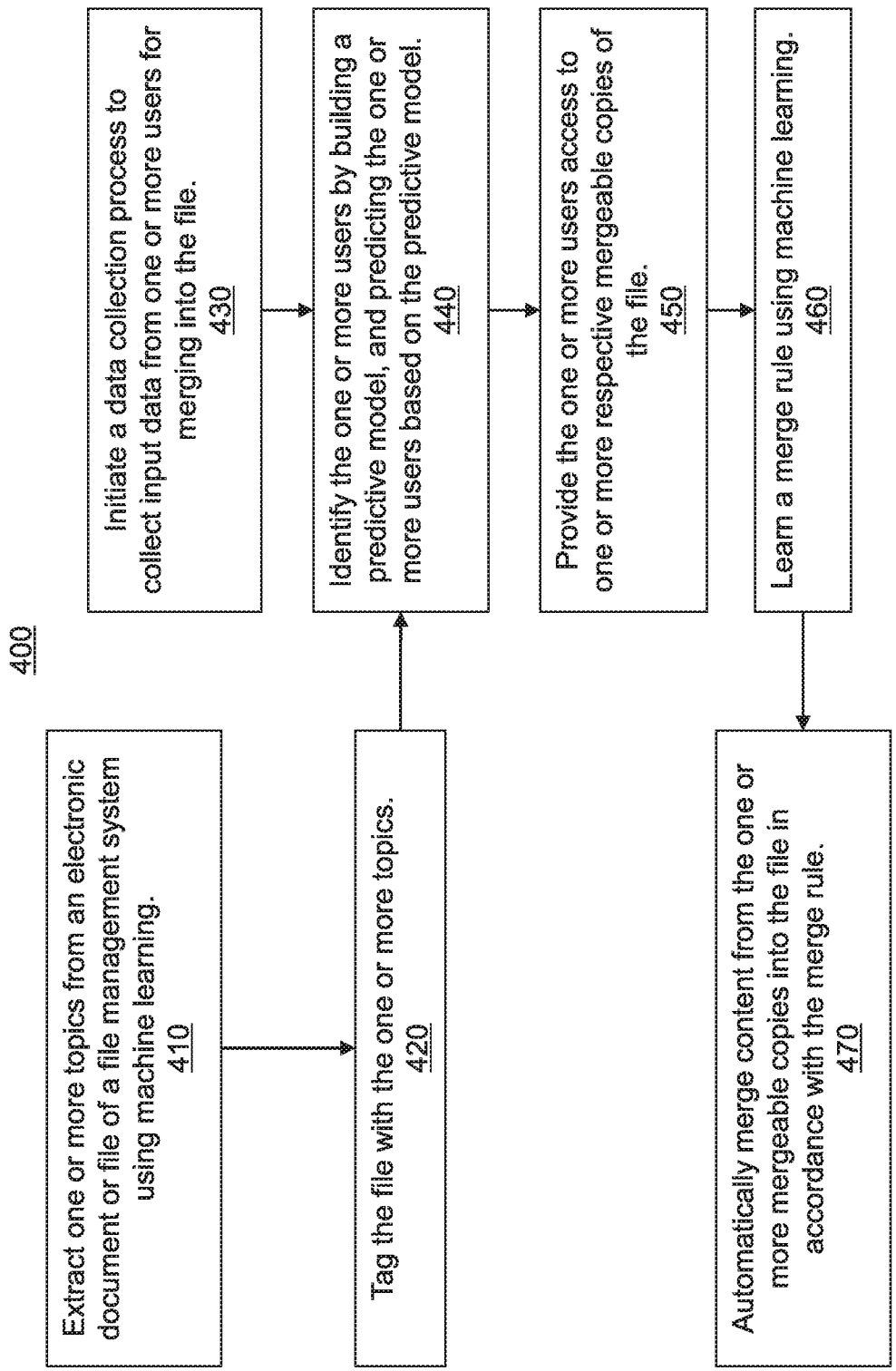
FIG. 4 is a block/flow diagram showing a system/method for maintaining file management systems using cognitive computing, in accordance with an embodiment of the present invention.

With reference to FIG. 4, a block/flow diagram is provided illustrating an overview of a system/method 400 for using cognitive computing to maintain a file management system, in accordance with an embodiment of the present invention.

At block 410, one or more topics are extracted from an electronic document or file of a file management system using machine learning. In one embodiment, the electronic document is a table-based electronic document (e.g., electronic spreadsheet). For example, the one or more topics can be extracted from the file by applying a topic modeling algorithm to an input including information from the file. The information from the file can include at least one of file content and file name. In one embodiment, applying the topic modeling algorithm includes implementing latent Dirichlet allocation (LDA). In natural language processing, LDA is a generative probabilistic model for sets of discrete data in which items of a data collection are modeled as a finite mixture over an underlying set of topics, and each topic is modeled as an infinite mixture over an underlying set of topic probabilities. For example, in the context of a corpus of documents, the documents can be represented as random mixtures over latent topics, and each topic can be characterized by a distribution over words. Further details regarding LDA will not be described herein.

At block 420, the file is tagged with the one or more topics. The one or more topics can provide generalized knowledge about the file. Such generalized knowledge can be used in the context of, e.g., identifying (e.g., predicting) one or more users for assigning one or more respective mergeable copies of the file, as will be described in further detail below.

At block 430, a data collection process to collect input data from one or more users for merging into the file is initiated. The data for the file can be collected from one or more users in an organization structure (e.g., hierarchy). For example, the data can be collected as a collaborative effort among a group of users.

At block 440, the one or more users (for assigning the one or more respective mergeable copies of the file) are identified by building a predictive model, and predicting the one or more users based on the predictive model. In one embodiment, building the predictive model includes obtaining data for building the predictive model. For example, the obtained data can include, e.g., organization information and user data. The organization information and user data can include, e.g., electronic mail data, electronic chat data, social media data, company policy data, and data related to user role in the organization. The organization information and user data can be obtained from at least one electronic source. The organization information and user data can be obtained from any suitable electronic sources in accordance with the embodiments described herein. For example, the at least one electronic source can include a Lightweight Directory Access Protocol (LDAP) server, a WorldWideWeb (W3) page, etc. LDAP is an open application protocol for accessing and maintaining distributed directory information servers over an Internet Protocol (IP) network. Directory servers can be used to develop Intranet and/or Internet applications by allowing the sharing of information about users, systems, networks, services, and applications throughout the network. For example, directory services can provide sets of records, which can have hierarchical structures. W3 is a wide-area hypermedia information retrieval initiative to provide universal access to electronic documents. Further details regarding LDAP and W3 will not be provided herein.

The predictive model can illustratively be represented as, e.g., {user→(topic, report line users, confidence)}. User feedback can be received to reinforce and/or update the predictive model. For example, reinforcement learning can be performed by applying the user feedback.

The one or more users are identified for purposes of assigning mergeable copies of the file. Identifying the one or more users can include providing the organization information and user data as input into an association rule learning process. Association rule learning is a type of rule-based machine learning method for discovering relationships between objects (e.g., variables) and generating association rules that highlight general trends. Any suitable techniques can be used for performing association rule learning and generating association rules.

For example, an Apriori-based algorithm, such as, e.g., Apriori or AprioriDP, can be used to mine association rules in databases. The "DP" in AprioriDP stands for Dynamic Programming. Generally, Apriori-based algorithms can identify frequent item sets (e.g., in a transactional database) and extend the frequent item sets to larger and larger item sets, as long as those item sets appear sufficiently often. An item set can be determined to be frequent if the item set appears in at least a threshold number of transactions. The frequent item sets determined by Apriori-based algorithms can be used to determine the association rules.

In one embodiment, identifying the one or more users further includes automatically generating a prompt of a data structure including a distribution list recommending the one or more users. For example, the distribution list can be embodied as a graphical user interface (GUI) which can be modified to add/edit/remove users. The distribution list can be arranged in a hierarchical fashion to indicate relationships between each user in the distribution list. An example of a distribution list will be described in further detail below with reference to FIG. 5.

At block 450, access to respective ones of the one or more mergeable copies of the file is provided to the one or more users. The one or more mergeable copies of the file can be referred to as "children" that are cloned from the "parent" file. Each user can maintain (e.g., archive and/or copy) his or her corresponding copy of the file. A relationship of the one or more mergeable copies can be built by leveraging analyzed trusted organization information. For example, the hierarchical relationship between the parent file and the child mergeable copies of the file can be mapped from the relationship of the one or more users.

In one embodiment, a mechanism can be provided for generating a notification after completion of data input into a mergeable copy. For example, a user can trigger the notification that the input in their corresponding copy is complete or done, and ready for merging into the file. For privacy purposes, the access of filled data of the files can be mapped from the relationship of the one or more users. In one embodiment, the input of each user can be anonymized such that each user's input to the file is not known. This can be particularly useful in cases where the electronic document is considered confidential, top secret, etc., or in cases where users may not want others in the group to know they are the contributors of certain data content.

At block 460, a merge rule is learned using machine learning. The merge rule can define how to collect the data for a specific range (e.g., list data, sum the data value, append the row, merge data row by row, etc.). The merge rule can be learned from, e.g., the merge rule of similar history files, the structure of the file and/or the content of the file. For example, the merge rule can be learned by performing analysis and association rule learning on files with a relevant topic.

At block 470, content from the one or more mergeable copies is automatically merged into the file in accordance with the merge rule. For example, each mergeable copy can be compared (e.g., automatically compared) with the file to identify changes within a specific range, sheet or an entirety of the file. Additionally, the embodiments described herein can write back changes into respective portions (e.g., table cells) of the file according to the merge rule.

The merging performed at block 470 can protect against content loss and errors that can result from multiple people collaborating on an electronic document. For example, merging performed at block 470 improves on manual methods of data input into digital sheets by, e.g., reducing errors and increasing efficiency as compared to such manual methods.

As an illustrative example of the system/method described above with reference to FIG. 4, let us assume that a person named Tom needs to collect budget expense data associated with a file called "Electronic Document A."

Figure 5:
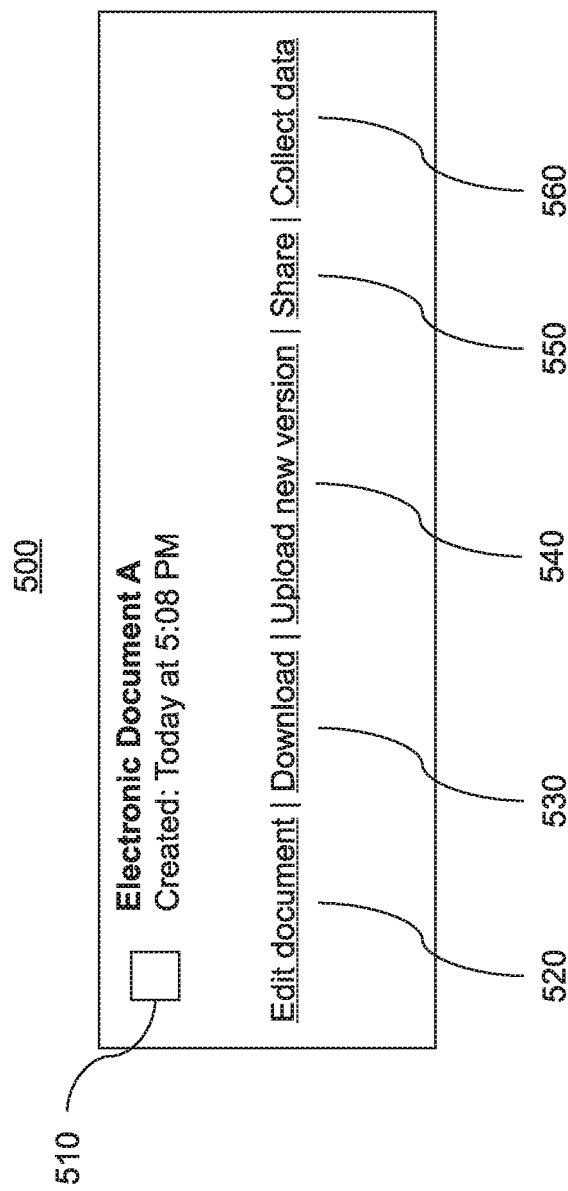
FIG. 5 is a block diagram showing an exemplary file selection interface, in accordance an embodiment of the present invention.

For example, with reference to FIG. 5, a block diagram is provided illustrating an exemplary file selection interface 500 (e.g., GUI) of a file management system. Tom can select Electronic Document A using radio button 510. Tom can select from a plurality of actions to take after selecting Electronic Document A. For example, Tom can select "Edit document" button 520 to edit Electronic Document A, "Download" button 530 to download Electronic Document A, "Upload new version" button 540 to upload a new version of Electronic Document A (e.g., update the current version of Electronic Document A), "Share" button 550 to share Electronic Document A with other entities over at least one network, and "Collect data" button 560 to initiate data collection from one or more people. Buttons 520-560 are purely exemplary and should not be considered limiting.

Tom selects the "collect data" button 560 to initiate data collection from one or more people for Electronic Document A. Initiating the data collection can include the file management system identifying one or more users for collecting data and assigning mergeable copies of the file based on a predictive model (e.g., as described above with reference to FIG. 4). In this illustrative example, let us assume that the identified users include Lisa, Peter, Tiffany, Amy and Sarah. For example, for the user Lisa, the predictive model can include {Lisa→(tree sales, Peter, 0.8}, {Lisa→(tree sales, Tiffany Amy, 0.9)} and {Lisa→(tree sales, Sarah, 0.8)}.

The one or more identified users can be associated with a data structure including a distribution list, which can be arranged in a hierarchical structure. For example, the one or more users within the distribution list can be automatically recommended by the system as a prompt including a GUI. An example of a data structure including a distribution list will now be described in further detail with reference to FIG. 6.

Figure 6:
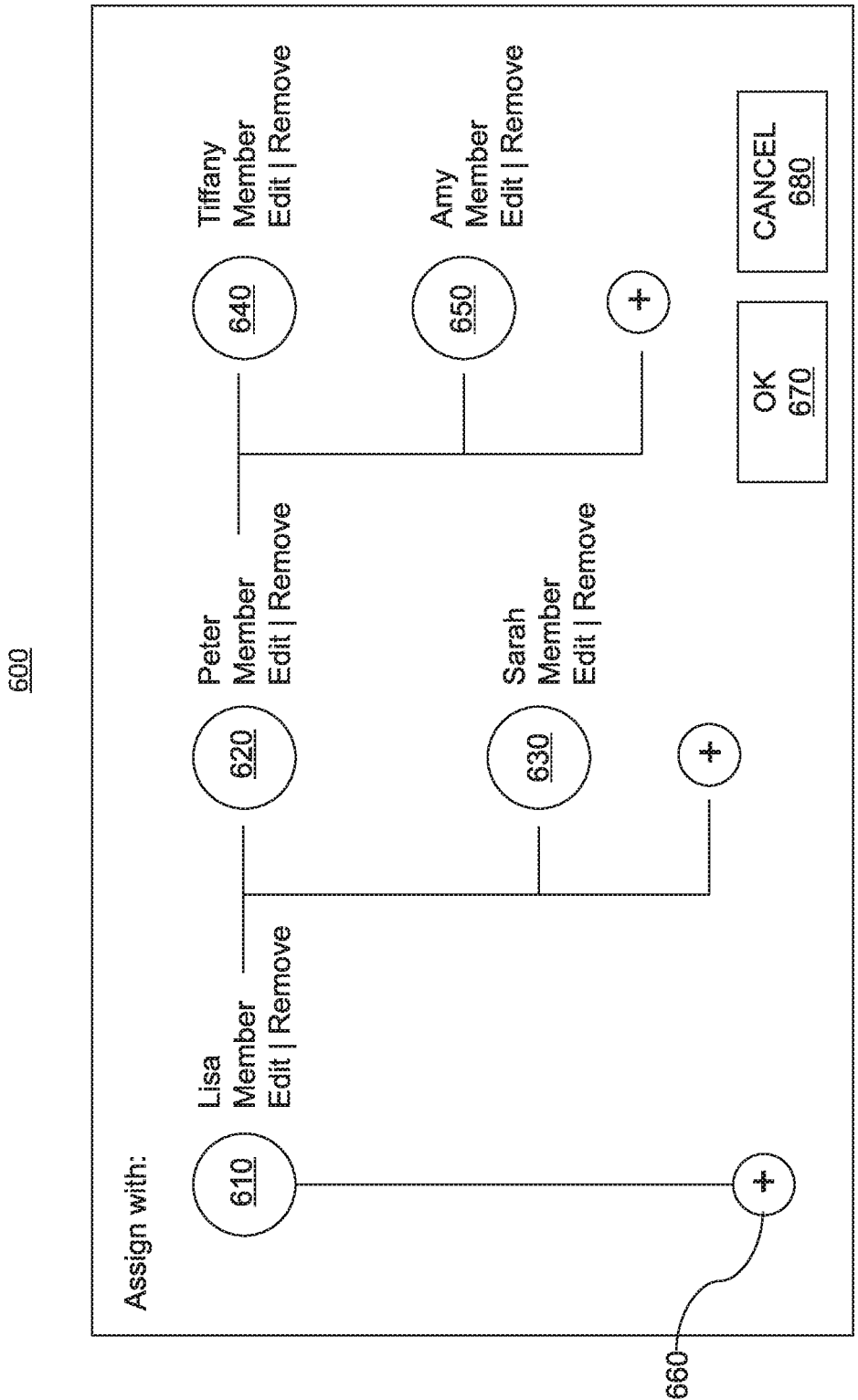
FIG. 6 is a block diagram showing an exemplary distribution list, in accordance with an embodiment of the present invention.

With reference to FIG. 6, a diagram is provided illustrating an exemplary distribution list 600. Here, the distribution list 600 is embodied as a GUI. The distribution list 600 includes a plurality of users, referred to in this example as "Members" 610-650, where Member 610 corresponds to "Lisa", Member 620 corresponds to "Peter", Member 630 corresponds to "Sarah", Member 640 corresponds to "Tiffany" and Member 650 corresponds to "Amy". As shown, the Members 610-650 are arranged in a hierarchical structure, where Lisa is at a first level of the hierarchy, Peter and Sarah are related to Lisa at a second level of the hierarchy, and Tiffany and Amy are related to Peter at a third level of the hierarchy. As further shown, an option is provided to "Edit" the details of the Members 610-650, or "Remove" the Members 610-650.

The distribution list 600 further includes a plurality of buttons 660 for adding new Members. As shown in this example, each of the plurality of buttons 660 corresponds to a level of the hierarchy, thereby allowing the addition of new Members to the distribution list 600 in corresponding levels of the hierarchy.

The distribution list 600 further includes an "OK" button 670 and a "CANCEL" button 680. The "OK" button 670 accepts the members in the distribution list 600, and can automatically assign respective mergeable copies of the file to the members in the distribution list. The "CANCEL" button 680 ends the process of assigning mergeable copies to respective users.

After Tom accepts the distribution list, the system can assign a mergeable copy of the file to each of Lisa, Peter, Sarah, Tiffany and Amy. For example, the system can clone five copies of the original file. After Lisa, Peter, Sarah, Tiffany and Amy have finished contributing data into their respective mergeable copies, they can trigger a notification that they have completed their respective data entries. The file management system can apply a merge rule for merging each of mergeable copies back into the original file. The hierarchy relationship of the files can then be mapped from the relationship of the users, and the access of the data filled into the files can be mapped from the relationship of the users. Accordingly, privacy between Lisa, Peter, Sarah, Tiffany and Amy can be maintained (e.g., if the data being collected is private or sensitive).

The embodiments described herein can dynamically distribute and collect data, such as, e.g., table-based document data, for collaboration among a group of users in a manner that conforms with any existing privacy requirements regarding the content, and protects against content loss that can generally result from multiple people editing content. For example, regarding privacy, the embodiments described herein can anonymize the input such that each user's individual input contribution is not known among the group. Moreover, the embodiments described herein improve on manual methods of data input into digital sheets by, e.g., reducing errors and increasing efficiency as compared to such manual methods. Additionally, the embodiments described herein can allow for each person to maintain (e.g., archive and/or copy) their own version of the digital sheet for, e.g., backtracking. The embodiments described herein can further provide improvements to computer-related technology. For example, the merging of individual files provided by respective users can reduce consumption of computing resources (e.g., storage resources) for implementing the file management system.

Having described preferred embodiments of a system and method for maintaining a file management system using cognitive computing (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for maintaining a file management system using cognitive computing, comprising:
   identifying one or more users for assigning respective mergeable copies of a file of a file management system using machine learning, including building a predictive model based on data including user data and predicting the one or more users based on the predictive model;
   providing the one or more users access to respective ones of the one or more mergeable copies of the file; and
   automatically merging content from the one or more mergeable copies into the file in accordance with a merge rule that defines how to merge input data collected from the one or more mergeable copies received from the one or more users.

2. The method of claim 1, further comprising obtaining the data for building the predictive model from at least one electronic source.

3. The method of claim 2, wherein the at least one electronic source includes at least one of a Lightweight Directory Access Protocol (LDAP) server and a WorldWideWeb (W3) page.

4. The method of claim 1, wherein identifying the one or more users further includes providing the obtained data as input into an association rule learning process.

5. The method of claim 4, wherein the association rule learning process includes an Apriori-based algorithm.

6. The method of claim 1, wherein identifying the one or more users further comprises generating a prompt of a data structure including a distribution list recommending the one or more identified users.

7. The method of claim 1, wherein building the predictive model further includes:
   extracting one or more topics from the file using machine learning, including applying topic modeling to information associated with the file; and
   tagging the file with the one or more topics.

8. The method of claim 1, further comprising learning the merge rule using machine learning.

9. A system for maintaining a file management system using cognitive computing, comprising:
   a memory device for storing program code; and
   at least one processor device operatively coupled to the memory device and configured to execute program code stored on the memory device to:
      identify one or more users for assigning respective mergeable copies of a file of a file management system using machine learning, including building a predictive model based on data including user data and predicting the one or more users based on the predictive model;
      provide the one or more users access to respective ones of the one or more mergeable copies of the file; and
      automatically merge content from the one or more mergeable copies into the file in accordance with a merge rule that defines how to merge input data collected from the one or more mergeable copies received from the one or more users.

10. The system of claim 9, wherein the at least one processor device is further configured to execute program code stored on the memory device to obtain the data for building the predictive model from at least one electronic source.

11. The system of claim 10, wherein the at least one electronic source includes at least one of a Lightweight Directory Access Protocol (LDAP) server and a WorldWideWeb (W3) page.

12. The system of claim 9, wherein the at least one processor device is further configured to identify the one or more users by providing the obtained data as input into an association rule learning process.

13. The system of claim 12, wherein the association rule learning process includes an Apriori-based algorithm.

14. The system of claim 9, wherein the at least one processor device is further configured to identify the one or more users by generating a prompt of a data structure including a distribution list recommending the one or more identified users.

15. The system of claim 9, wherein the at least one processor device is further configured to build the predictive model by:
   extracting one or more topics from the file using machine learning by applying topic modeling to information associated with the file; and
   tagging the file with the one or more topics.

16. The system of claim 9, wherein the at least one processor device is further configured to execute program code stored on the memory device to learn the merge rule using machine learning.

17. A computer program product comprising a non-transitory computer readable storage medium having program code embodied therewith, the program code executable by a computer to cause the computer to perform a method for maintaining a file management system using cognitive computing, the method performed by the computer comprising:
   identifying one or more users for assigning respective mergeable copies of a file of a file management system using machine learning, including building a predictive model based on data including user data and predicting the one or more users based on the predictive model;

providing the one or more users access to respective ones of the one or more mergeable copies of the file; and automatically merging content from the one or more mergeable copies into the file in accordance with a merge rule that defines how to merge input data collected from the one or more mergeable copies received from the one or more users.

18. The computer program product of claim 17, wherein the method further comprises obtaining the data for building the predictive model from at least one electronic source, and wherein the at least one electronic source includes at least one of a Lightweight Directory Access Protocol (LDAP) server and a WorldWideWeb (W3) page.

19. The computer program product of claim 17, wherein identifying the one or more users further includes:

providing the data as input into an association rule learning process; and generating a prompt of a data structure including a distribution list recommending the one or more identified users.

20. The computer program product of claim 17, wherein building the predictive model further includes:

extracting one or more topics from the file using machine learning, including applying topic modeling to information associated with the file; and tagging the file with the one or more topics.

* * * * *